US005318466A

United States Patent [19]

Nagafusa

[11] Patent Number: 5,318,466

[45] Date of Patent: Jun. 7, 1994

[54] REMOTE-CONTROL DEVICE FOR MARINE PROPULSION UNIT

[75] Inventor: Makoto Nagafusa, Hamamatsu, Japan

[73] Assignee: Sanshin Industries, Co., Ltd., Shizuoka, Japan

[21] Appl. No.: 990,059

[22] Filed: Dec. 14, 1992

[30] Foreign Application Priority Data

Dec. 25, 1991 [JP] Japan ........ 3-356897

[51] Int. Cl.[5] ........ B62H 21/21

[52] U.S. Cl. ........ 440/86; 440/84

[58] Field of Search ........ 114/144 R; 440/84, 85, 440/86, 87, 2; 74/480 B, DIG. 8

[56] References Cited

U.S. PATENT DOCUMENTS

| | | | |
|---|---|---|---|
| 4,739,236 | 4/1988 | Burkenpas | 440/87 |
| 4,759,731 | 7/1988 | Uchida et al. | 440/84 |
| 4,836,809 | 6/1989 | Pelligrino | 440/84 |
| 5,074,810 | 12/1991 | Hobbs | 440/87 |
| 5,080,619 | 1/1992 | Uchida et al. | 440/86 |
| 5,142,473 | 8/1992 | Davis | 440/87 |

*Primary Examiner*—David M. Mitchell
*Assistant Examiner*—Stephen P. Avila
*Attorney, Agent, or Firm*—Bacon & Thomas

[57] ABSTRACT

A remote-control device incorporates a remote-control lever for the shifting and throttle operations of a marine propulsion unit. A shift range exists in the central region of lever movement where only shift operations can take place, and once the remote-control lever has passed through the above mentioned specific movement range, it is in a throttle range wherein its movement can control only the throttle. The remote-control device includes a throttle drive control arrangement which opens and closes the throttle valve in relation to the operation of the above mentioned remote-control lever in a manner which depends upon an operator selected operational mode made via a mode select switch.

9 Claims, 7 Drawing Sheets

FIG. 5
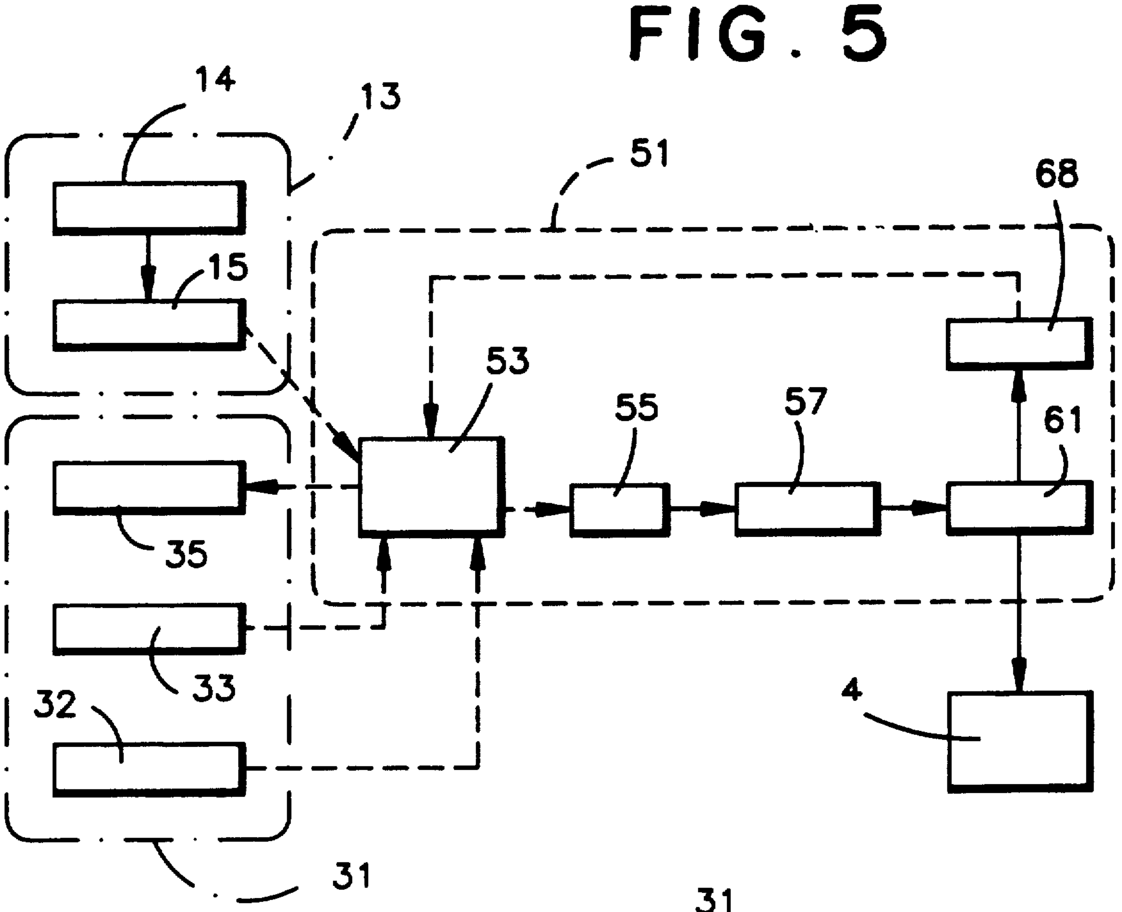
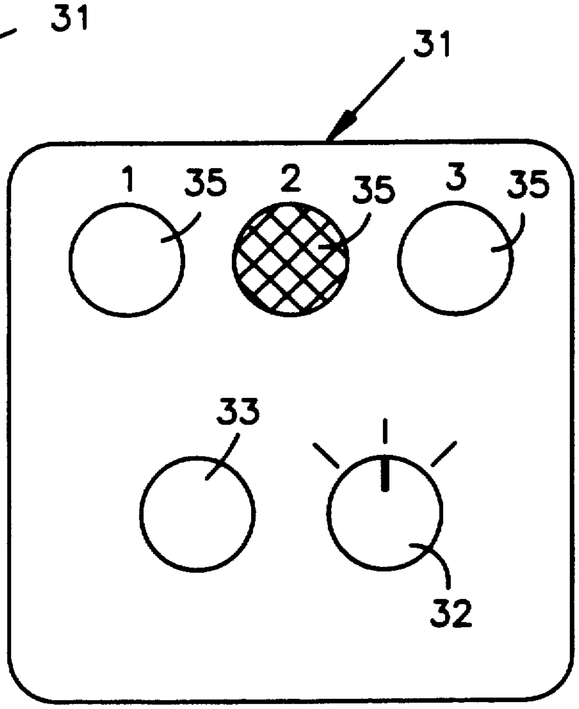
FIG. 6

REMOTE-CONTROL DEVICE FOR MARINE PROPULSION UNIT

BACKGROUND OF THE INVENTION

1. Field of the Invention

The present invention pertains to an improvement in a remote-control device for marine propulsion units and, more particularly, a remote-control device which simplifies making fine throttle adjustments and finding a neutral shift position.

2. Discussion of the Prior Art

Most marine outboard or stern drive marine propulsion units known in the art can be operated remotely, by a remote-control device. Such remote-control devices generally consist of one remote-control lever positioned near an operator's seat for both shifting and throttle operations. Such remote-control devices have a shift range (a range on either side of a central position of the lever) corresponding to a position in which a throttle valve of the marine propulsion unit would be maintained in a fully closed (idle state) position. In these arrangements, drive shifting operations can only be performed when the remote-control lever is positioned in this shift range. After the remote-control lever is shifted out of the shift range to a throttle range, the propulsion direction would be established and maintained while only the throttle valve would be opened and closed (controllable from a fully closed to a fully open position).

The compact nature of the remote-control devices of the prior are limits the permissible operating range of the remote-control levers. Therefore, in designing this control, a rather large lever movement range had to be included for both the shift range and the throttle range. However, during trolling and other low speed operations, there is a need for fine throttle adjustments. This need has been met in the prior art by using a broad throttle range. To accomplish this, however, the shift range would have to be made smaller, which makes it difficult to readily locate the neutral position midway where shifting operations can be performed. On the other hand, in order to facilitate locating the neutral position, it is desirable to enlarge the shift range. If the shift range is broadened by decreasing the throttle range, then it becomes more difficult to make fine throttle adjustments while trolling or operating at low speeds. The reason for this is that the throttle must be controlled from a fully closed to a fully open position within a very narrow throttle lever movement range. Thus, a balance must be reached in such prior art remote-control devices between enhancing the ability to find the neutral position and enabling fine throttle adjusments.

SUMMARY OF THE INVENTION

The object of the present invention, developed after reflecting upon the above state of the art, is to provide a remote-control device for marine propulsion engines which permits both fine throttle adjustments and readily determining a midway shift position.

In order to attain the above objective, this invention provides a remote-control device for a marine propulsion unit which uses at least one remote-control lever for the shifting and throttle operations having a central shift range within the entire lever movement range wherein only shift operations can take place and, once the above mentioned remote-control lever has passed through the above mentioned central shift range, it enters a throttle range wherein its movement can control only the position of the engine throttle. More particularly, the remote-control device of the present invention includes a throttle driver which opens and closes the throttle valve in response to shifting of the remote-control lever in dependence upon a selected operational mode. In a first operational mode, movement of the remote-control lever adjusts the throttle valve in a linear fashion between fully closed and fully open positions. In a second mode, operation of the remote-control lever within the throttle range corresponds to a fine adjustment opening and closing of the above mentioned throttle valve. A switch is provided for selecting between the two modes. The throttle valve driver is controlled in a manner dependent upon the mode selected by the mode switch.

In a second embodiment, the throttle valve drive has at least two modes of operation: a slow speed mode in the throttle range in which the throttle valve can open from a fully closed to a midway open position and a normal mode where the throttle valve can open from a fully closed to a fully open position. A switch is provided for selecting between the above mentioned two modes such that the throttle valve driver is controlled in a manner dependent upon the mode selected by the mode switch. Therefore, depending upon the preferences of the operator, the mode can be changed to a desired operating mode.

This arrangement makes it possible to establish a wide shift range for the operating lever, and even though the throttle operation range is narrowed as a result, by changing modes to the low speed mode, it is possible to make fine throttle adjustments. When operating at full throttle, the mode changing switch allows the operation of the remote control lever to be switched to the normal operating mode to allow control over the full range of operation, i.e., from fully closed throttle to fully open. In this normal operating mode, control takes place in a manner similar to that discussed above with respect to the remote control devices of the prior art.

Further objects, features and advantages of the present.invention will become more readily apparent from the following description of preferred embodiments of the invention when taken in conjunction with the following drawings.

BRIEF DESCRIPTION OF THE DRAWINGS

FIG. 5 shows a control schematic of the remote-control device.

FIG. 6 is a front view of a switch panel of the present invention.

FIGS. 11 and 12 are graphs involving a second embodiment wherein FIG. 11 shows the relationship between the position of the remote-control lever and the throttle opening in a normal mode; and FIG. 12 shows the relationship between the position of the remote-control lever and the throttle opening in an operational mode analogous to that in the prior art.

DETAILED DESCRIPTION OF THE INVENTION

Figure 1:
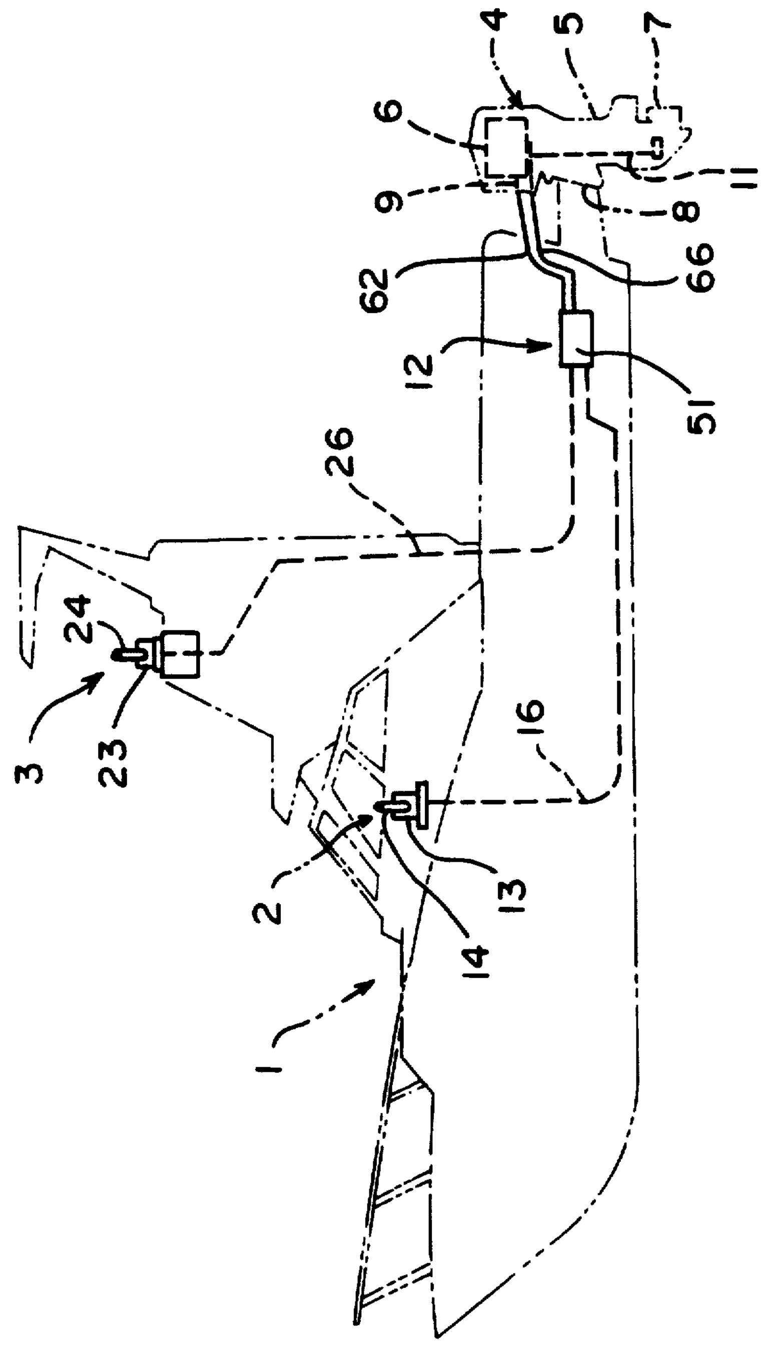
FIG. 1 is a schematic side view of a watercraft incorporating the remote-control device of the present invention.

With initial reference to FIG. 1, a watercraft 1 is shown having a main control area 2 and a remote control area 3. Watercraft 1 is propelled by an outboard engine 4. Outboard engine 4 consists of a propulsion unit 5 and an upper cowling (not labeled) located above the propulsion unit 5 and covering an internal combustion engine 6. A propeller 7, driven by engine 6, provides propulsion for watercraft 1. Propulsion unit 5 includes a bracket 8 which allows the propulsion unit 5 to be swiveled and tilted with respect to watercraft 1. Engine 6 is equipped with a carburetor 9 having a throttle valve 10. Opening and closing of throttle valve 10 in carburetor 9 controls the amount of charge supplied to engine 6. The propulsion unit 5 also incorporates a shift device generally shown at 11 which governs the rotational direction of propeller 5 for forward or reverse thrust as is known in the art.

Reference numeral 12 denotes a remote-control device which permits controlling outboard engine 4 from the main and remote control areas 2 and 3. The accomplish this function, there are electrical connections linking remote-control device 12

Reference numeral 12 denotes a remote-control device which permits controlling outboard engine 4 from the main and remote control areas 2 and 3. To accomplish this function, there are electrical connections linking remote-control device 12 with remote-control units 13, 23, positioned in control areas 2 and 3 respectively. These connections comprise wires 16 and 26 interconnecting an electrically driven actuator 51 to various switches 32, 33 on a switch panel 31 to be described below. There is also a mechanical connection consisting of a throttle cable 62 and a shift cable 66 between the electrically operated actuator 51 and the outboard engine 4. In the preferred embodiment shown, a dual station remote control unit 12 has been used, which means that the outboard engine 4 can be controlled by using either the remote control unit 13 in control area 2 or the remote control unit 23 in control area 3.

The remote control unit 13 will now be described with specific reference to FIG. 2. Since the structure and operation of the remote control units 13 and 23 are the same, a separate detailed description of remote control unit 23 will be omitted.

Remote control unit 13 consists of a remote-control lever 14 which is free to move around a pivot point (not labeled) and a lever-position detector 15 which detects the rotational position of remote-control lever 14. In FIG. 2, the position A for remote-control lever 14 correspond to a neutral position, the B position is forward, and the B' position is reverse. When the remote-control lever 14 moves from the B position to the C position, the shift device 11 maintains its current forward drive state. When the remote control device of the present invention is in a normal mode, as will be discussed more fully below, the throttle valve 10 can be controlled, by a control unit 53, from its fully closed (idle) state to its fully open state over the range from positions B to C. In a low speed mode, the throttle valve 10 can be controlled from its fully closed (idle) state to a midway open state (which is ½ open in the preferred embodiment). When in a shift mode, control unit 53 of actuator 51 is designed so as to maintain throttle valve 10 in a fully closed (idle) position. If the remote-control lever 14 is rotated from the B' to the C' positions, the shift device 11 remains in its current reverse drive state and control unit 53 permits throttle valve 10 to be changed from a fully closed (idle) to a fully open position. The structure and method of operation of control unit 53 will be more fully discussed below.

The position of the remote-control lever 14 is constantly detected by the lever position detector 15. The detected value is sent on wire 16 to the control unit 53 for the electrically driven actuator 51. The A to B range, as well as the A to B' range defines the so-called shift range. This shift range has been made broader than in the prior art to make it easier to find the neutral position. In accordance with the invention, if the remote-control lever 14 is returned in the direction of the A position, the shifter 11 is disengaged to neutral.

Figure 2:
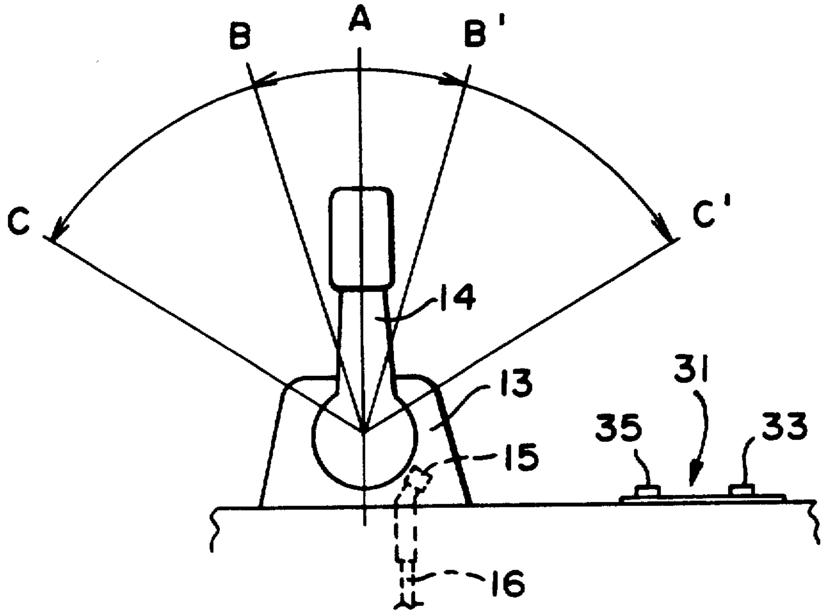
FIG. 2 is a front view of the remote-control device in its various operating positions.

A switch panel 31 is located just behind the remote-control unit 13 as shown in FIG. 2. As shown in FIG. 6, at the top of the switch (SW) panel 31 there is a station display lamp 35. This station display lamp 35 corresponds to a control operating seat/area number. In an embodiment having two control areas 2, 3 as discussed above, two station display lamps are used. However, FIG. 6 corresponds to an embodiment having three operator control areas, so three lamps 35', 35'' and 35''' have been installed. Just one of the station display lamps can be lighted at one time, the others remaining off. The lighted lamp indicates the station from which remote-control operations can be performed.

At the bottom left side of SW panel 31, there is a station change switch 33 which is of the momentary type. This station change switch 33 determines which of the remote control units 13, 23 are activated by control unit 53. For example, in order to select remote control unit 13 in operating area 2, station change switch 33 would be used to cause a signal to be sent on wire 16 to the control unit 53 of electrically driven actuator 51 which results in control unit 53 taking signals only from remote control unit 13 at operating area 2. Accordingly, only shift and throttle-control signals from the remote control unit 13 will be relayed to and from control unit 53.

On the lower right side of the SW panel 31 there is a switch (SW)32 which is a mode-selection switch. This mode switch 32 can be rotated to select a low speed mode, a normal mode or a shift mode. In this embodiment, a shift mode has been separately established, but in the spirit of this invention, the only requirement is that there be at least two modes, a low speed mode and a normal mode. There is a similar switch panel 31 provided at the upper operating area 3, but since its structure and functions are the same, a separate explanation of it will be omitted.

Figure 3:
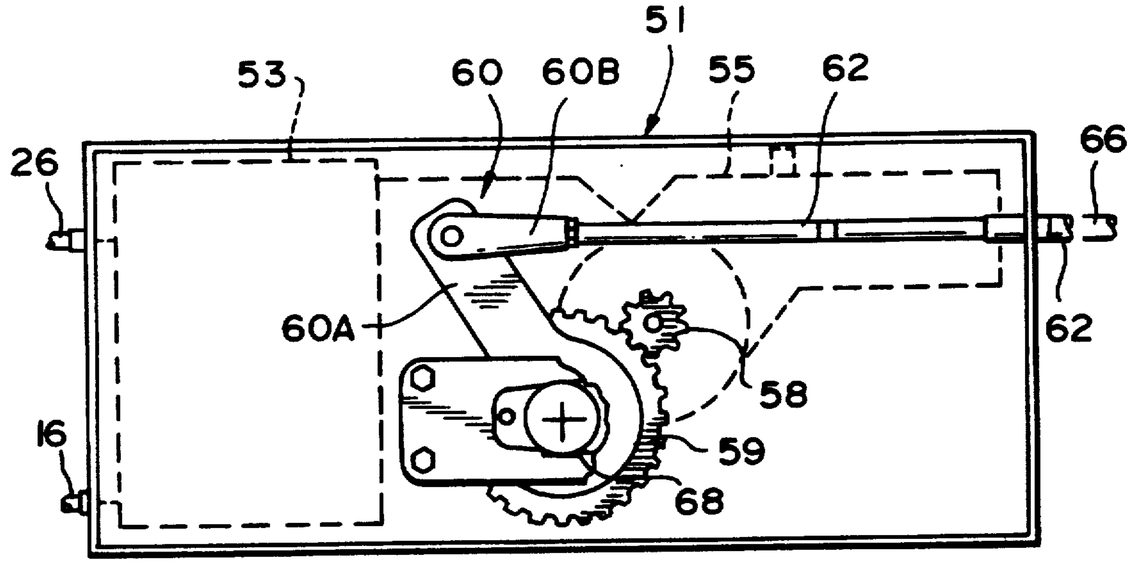
FIG. 3 depicts an electrical actuator incorporated in the remote-control device of the present invention.
Figure 4:
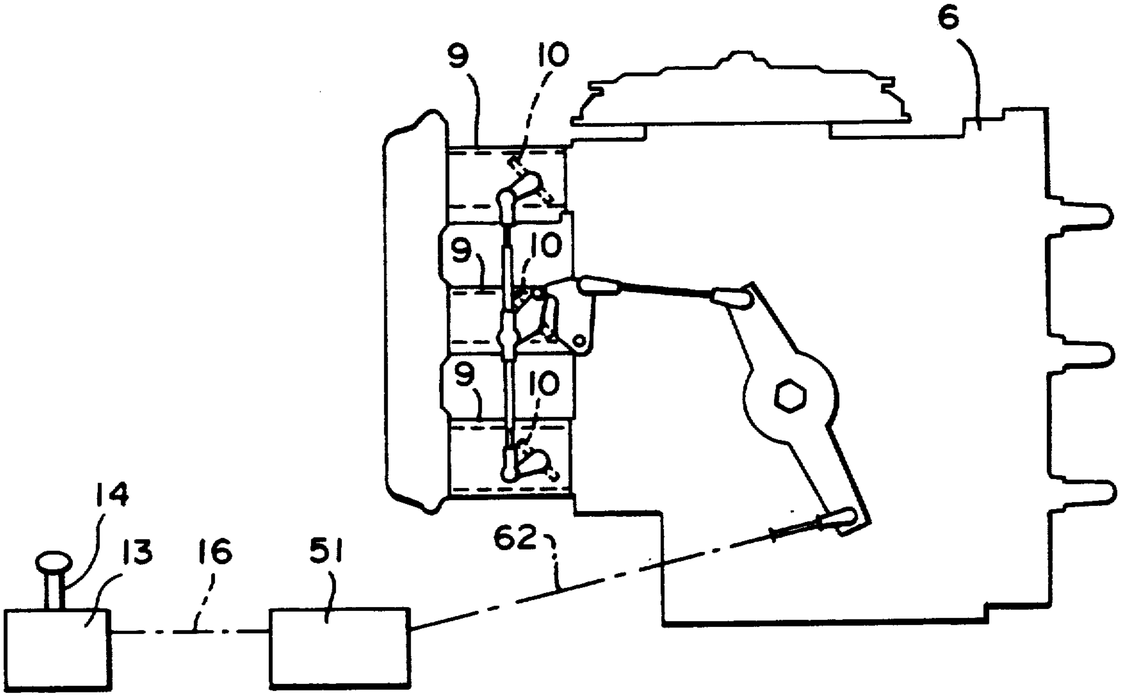
FIG. 4 is a block diagram of the remote-control device.

Next, the structure and the operation of the electrically driven actuator 51 will be described with reference to FIGS. 3 and 4. Control unit 53 is housed inside the casing of the electrically driven actuator 51. On the right side (in FIG. 3) is an electric motor 55. There is a drive transmission mechanism 54 between the control unit 53 and the motor 55. This drive transmission mechanism 54 consists of a drive gear 58, affixed to the motor 55, which engages a driven gear 59 rotatably supported on the electrically driven actuator 51. Near the center axis of driven gear 59 is a position detector 68 which detects the operational position of a cable drive mechanism 60. The cable drive mechanism 60 consists of an arm 60A which is affixed to the driven gear 59. At the tip of arm 60A, there is pivotally secured an attachment fitting 60B. The fitting 60B is connected to an inner cable 64 of throttle cable 62. This inner cable 64 projects from the casing of the electrically driven actuator 51 and, along with an outer cable 66 which covers it, comprises the throttle cable 62 which extends to the throttle valve 10 of the outboard engine 4.

With a command signal from control unit or controller 53, the motor 55 rotates and the rotational force is transmitted through drive gear 58, driven gear 59, arm 60A, and fitting 60B to operate the inner cable 64 of throttle cable 62, which, in turn, operates throttle valve 10. On the other hand, the position detector 68 indirectly detects the position of the throttle cable 62 and that signal is sent to the controller 53 as feedback. To wit, if the opening of throttle valve 10, which in this embodiment is determined by the position of the throttle cable 62, has not reached the position indicated by the controller 53 as detected by the position detector 68, then the controller 53 sends a drive command to the motor 55 to open the throttle valve 10. Conversely, if the throttle valve 10 has overshot the position indicated by the controller 53, then controller 53 issues a motor drive command which closes the throttle valve 10. This feedback makes it possible for the throttle valve 10 to accurately follow the position of the respective remote-control lever 14, 24.

Shift device 11 is driven by a similar motor, cable drive mechanism and shift cable (not shown). When the remote control lever 14, 24 is in the A position, the shift device 11 is in the neutral condition. When lever 14 or 24 is rotated toward position B, the shift device is in a forward propulsion state. When the remote control lever 14 or 24 is rotated in the direction of B', propulsion unit 5 is shifted into a reverse propulsion state. If lever 14 or 24 is then rotated further from B to C or from B' to C', the direction of propulsion does not change, it remains either forward or reverse.

Figure 8:
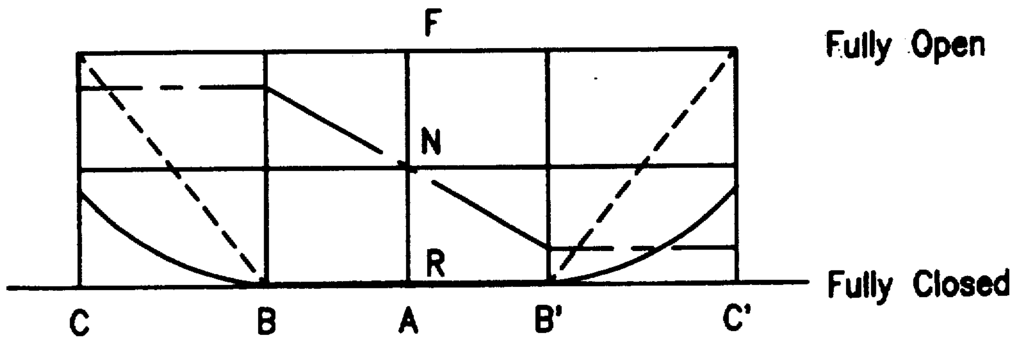
FIG. 8 is a graph showing the relationship between the remote-control lever position and the throttle and the shift positions in a low speed operational mode.
Figure 9:
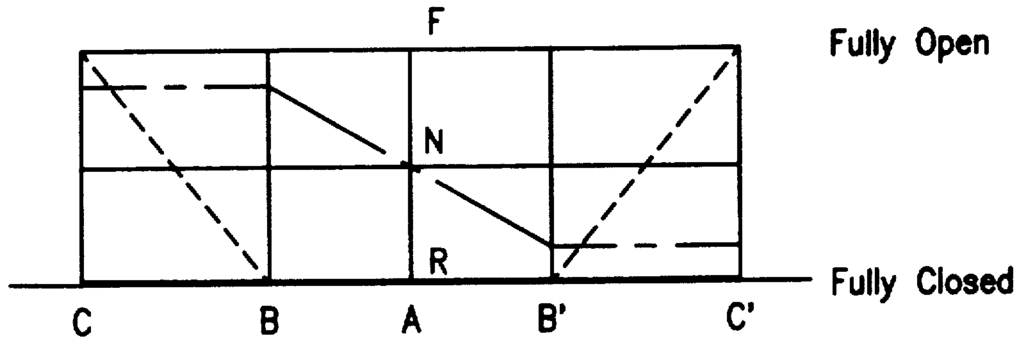
FIG. 9 is a graph showing the relationship between the position of the remote-control lever and the throttle and shift positions in a shift mode.
Figure 10:
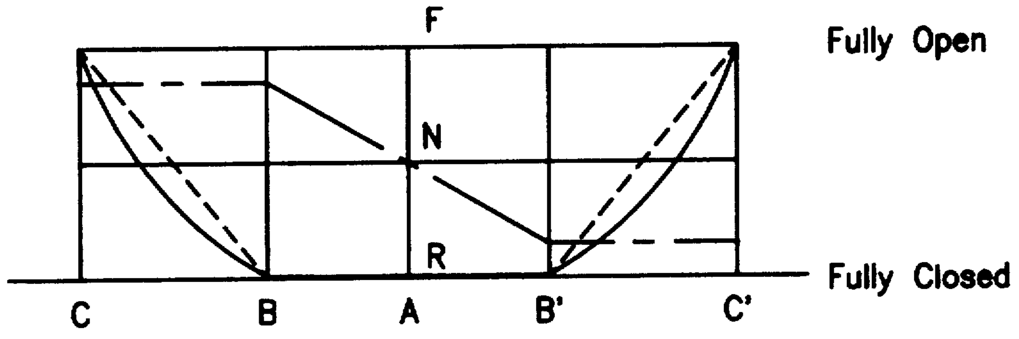
FIG. 10 is a graph showing the relationship between the position of the remote-control lever and the throttle and shift positions in a normal mode.

The various operating modes will now be explained with reference to FIGS. 8 through 10. In FIGS. 8-10, the shift position (F is forward, R is reverse) is indicated on the horizontal axis and the opening state of throttle valve 10 is indicated on the vertical axis. The solid line shows the state of the throttle valve 10, the solid-dot broken line indicates the position of the shift device 11, and the dashed line shows the relationship of a throttle valve opening using a prior art remote-control device.

FIG. 9 shows the position of the shift device 11 and the degree to which the throttle valve 10 opens when in the shift mode. When the mode-switch 32 is moved to the "shift" mode, a corresponding signal is sent to controller 53 to put it in the shift mode. In this state, when the remote-control lever 14 arrives at point B from point A, the lever-position detector 15 issues a signal to the controller 53. Then, a signal from the controller 53 causes the motor (not shown) to drive the shift device 11, shifting it from neutral to forward. During this time, however, no signal is sent from the controller 53 to the motor 55 which drives the throttle valve 10. Instead, throttle valve 10 remains closed (in the idle position). Next, when the remote-control lever 14 is moved from point B to point C, the lever-position detector 15 similarly sends a signal to controller 53. However this does not cause the controller 53 to send a signal to the motor (not shown) to drive the shift device 11 and the throttle valve 10 remains completely closed (idle position). Accordingly, even if the remote-control lever 14 is operated throughout the whole throttle range, the throttle valve 10 remains closed. Simply stated, when the remote-control lever 14 is moved from the A to B positions in the shift mode, the shift device 11 is operated; when it is then moved from B to C, the shift device 11 does not operate. Similarly, when the remote-control lever 14 is moved from A to B', the shift device 11 is operated, but in moving from B' to C', the shift device does not operate. Therefore, using the shift mode is highly desirable when docking because the only operating conditions are slow forward, neutral and slow reverse.

FIG. 8 will now be used to describe the low speed mode. FIG. 8 shows the position of the shift device 11 and the degree to which the throttle valve 10 is open in response to the position of the remote-control lever 14 while in the low speed mode. When the mode selection switch 32 is placed in the "low speed" mode, a signal is sent to controller 53. In this mode, when the remote-control lever 14 is moved from position A to B, a signal is sent from the lever-position detector 15 to the controller 53. Controller 53 then issues a signal to cause the motor (not shown) to drive the shift device 11 to shift it from neutral into forward. However, during this time, the controller 53 does not send a signal to motor 55 to cause it to move the throttle valve 10. The controller 53 sends a signal to motor 55 to gradually open the throttle valve from its fully closed condition (idle), but it does not open it all the way. Even if the remote-control lever 14 is operated in the entire throttle range, the throttle valve 10 is controlled so that it can only open from the fully closed position $\frac{1}{3}$ of the fully open position. this characteristic is prominent in the comparison with the remote control of the prior art (dashed line in the Figure). In this example, the remote-control lever 14 can be used for the fine control of the throttle valve 10. Thus, fine adjustment of the throttle valve 10 is easily accomplished in the low speed mode.

FIG. 10 shows the position of the shift device 11 and the degree to which the throttle valve 10 is open with respect to the position of the shift lever 14 during normal mode operations. When the mode changing switch SW 32 is placed in the "normal" position, a corresponding signal is sent to controller 53. In this mode, when the remote control lever 14 is moved from position A to B, the lever-position detector 15 sends a signal to controller 53. Then, controller 53 issues a signal to the drive motor (not shown) for the shift device 11 which shifts it from neutral to forward. During this time, however, the controller does not send a signal to the drive motor 55 for the throttle valve and the throttle valve 10 remains fully closed (idle position). Next when the remote-control lever is moved from position B to position C, the lever-position detector 15 sends a signal to the controller 53. At this time, the controller 53 also sends a signal to motor 55 which drives the throttle valve 10, and the throttle valve 10 gradually opens from its fully closed (idle state) to as much as the fully open state. Thus, when the remote control lever 14 is being operated in the throttle-control range, it is possible to control the throttle valve 10 from the fully closed to the fully open state. The difference with the prior art is that the degree to which the throttle valve 10 is open is proportional to the displacement of the remote-control lever in the prior art, but in this embodiment, it is non-linear. In other words, when the remote-control lever 14 is moved forward slightly from position B, the degree to which the throttle valve 10 is opened is less than the displacement of the lever. Accordingly, this permits fine adjustment of the throttle valve 10. However, when the remote-control lever 14 is moved forward substantially from position B to the vicinity of position C, compared with the amount of displacement of the remote-control lever 14, the throttle valve 10 is opened wider. To wit, in the vicinity of the fully open position of the throttle valve 10, it is impossible to make fine adjustments of the throttle valve 10. However, since there is little change in engine RPM corresponding to the degree of openness of the throttle valve 10 when it is near the fully open position, there is no need to make fine adjustments of the throttle valve 10 at this time.

Figure 11:
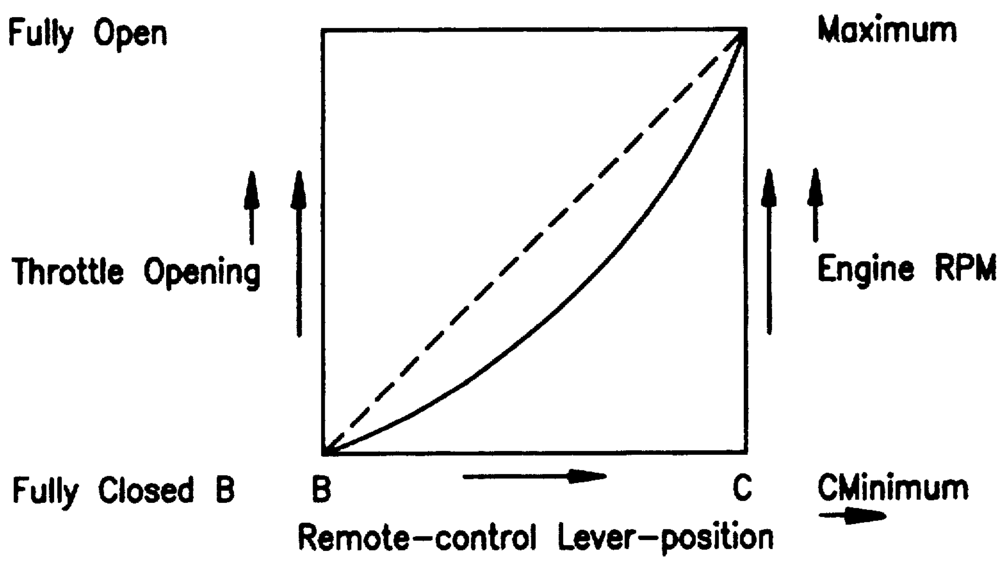
Figure 12:
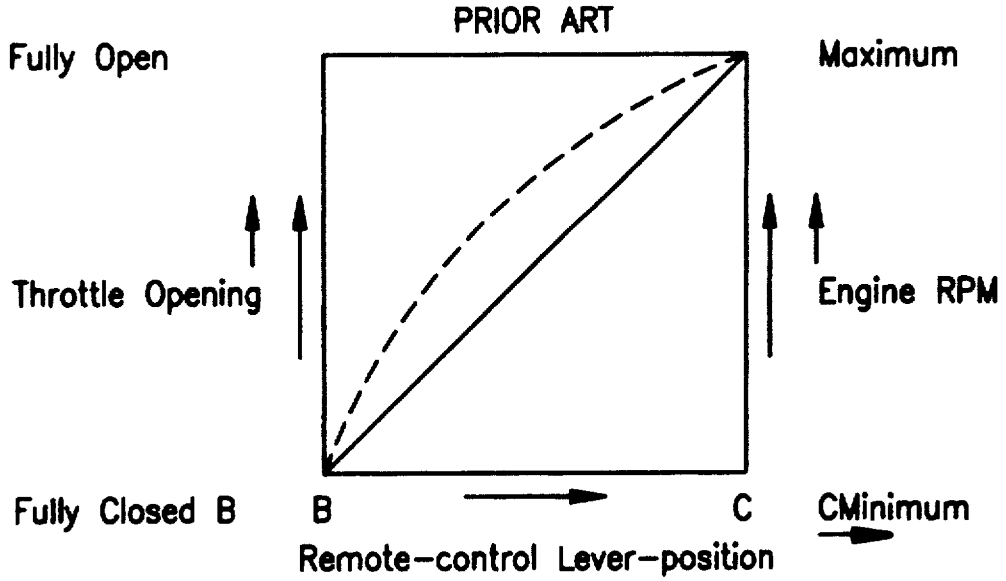

FIGS. 11 and 12 will now be used to describe a second embodiment. As shown in FIG. 11, when the remote-control lever 14 is moved slightly forward from position B in a normal operating mode, there is little change in the opening of the throttle valve 10 in relation to the displacement of the remote-control lever 14. However, as shown by the broken line indicating engine RPM, there is a near-linear increase. If the remote-control lever 14 is moved forward substantially from position B, to the vicinity of position C, throttle valve 10 opens more than the related displacement of the remote-control lever 14. However, as shown by the broken line, there is a near-linear change in the engine RPM with respect to the displacement of the control lever 14. This makes the throttle operation easy in a manner directly analogous to that described above with reference to FIG. 10. On the other hand, when the mode switch 32 is used to select the shift mode, as shown in FIG. 12, the relationship between the lever displacement and the throttle valve opening becomes linear as in the prior art. The engine RPM, as shown by the broken line, changes rapidly when the lever is in the vicinity of position B, but changes relatively slowly when the lever is in the vicinity of position C. This means that the operation of the remote-control lever 14 does not cause a linear change in the engine RPM. Accordingly, in this embodiment, by selecting between the normal mode and the prior art operational mode, it is possible to control the engine in either a conventional manner or a mode can be selected so that the movement of remote-control lever 14 is proportional to the engine RPM.

Figure 7:
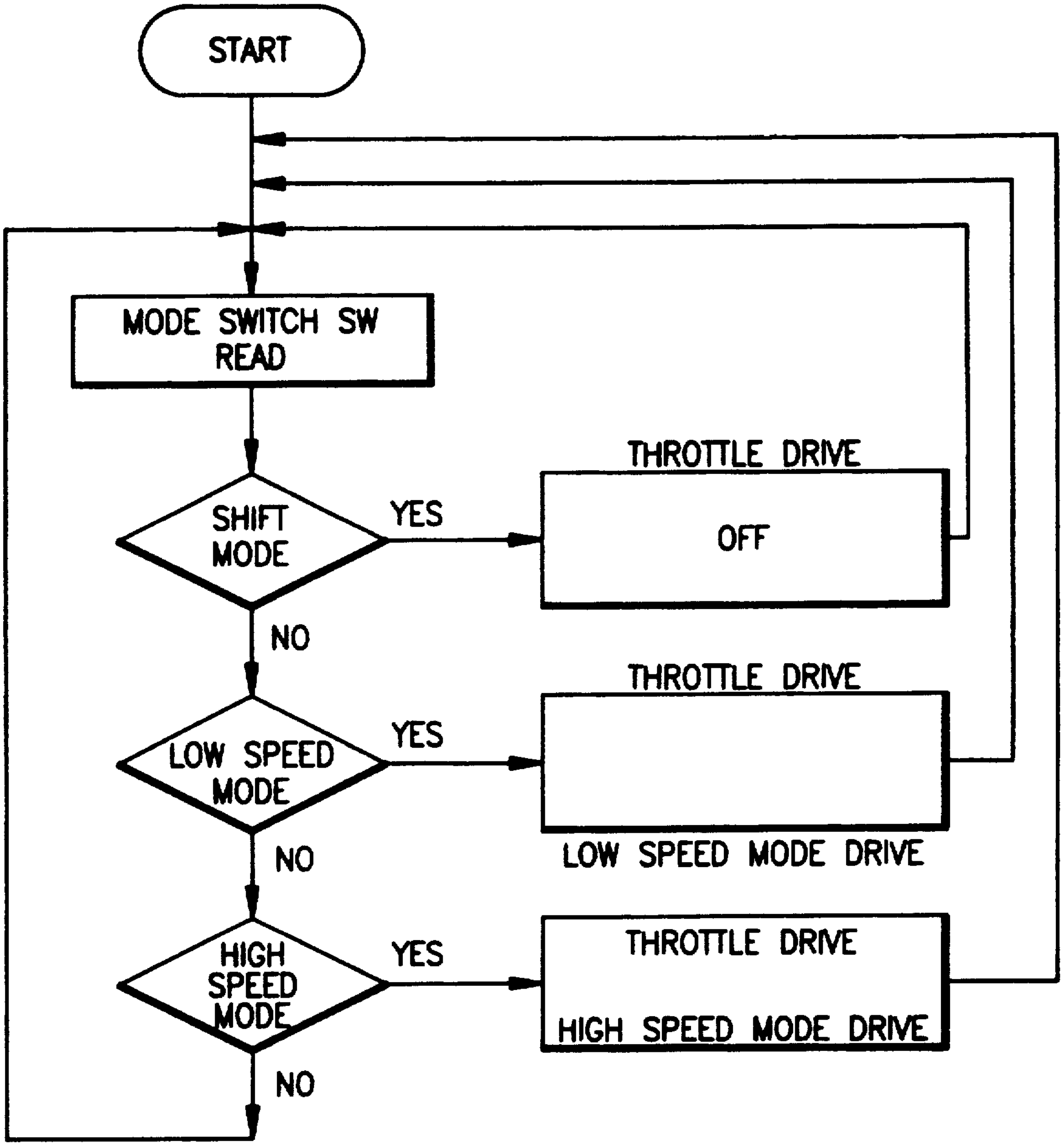
FIG. 7 is a flow chart for the operation of the remote-control device.

FIG. 7 is a flow chart of the control method used by the controller 53. First, controller 53 determines the position of the mode switch 32 to determine its position. Based on that determination, if it is in the shift mode, it turns motor 55 off. If mode switch 32 is in the low speed mode, it drives motor 55 in the low speed mode. If it determines a normal operational mode, motor 55 is driven in the normal mode. The mode switch 32 can operate only when the remote-control levers 14, 24 are in the below described positions. When changing from the low speed mode to the normal mode, the change can only be made when the remote-control lever 14, 24 is between A and B or between A and B'. In other words, it is impossible to change the mode when the lever is between B and C or between B' and C'. When the mode is being changed from the shift mode to the normal mode, the remote-control lever 14, 24 must be in the center position (A). If the corresponding remote-control lever 14, 24 is not in the center position, the mode can be changed by operating the mode-switch 32 from the shift to the normal mode only after the lever has been returned to the center position.

By the above description of preferred embodiments of the invention, it should be apparent that this invention makes it possible to control a marine propulsion unit as desired by means of mode switching. The mode switching capability also allows fine throttle adjustments as well as easy shifting into the neutral position. It is also possible to operate the unit with the throttle valve fully open as known in the prior art. Although described with reference to preferred embodiments of the invention, it should be understood that various changes and/or modifications can be made without departing from the spirit thereof. For instance, in these embodiments, the throttle valve is driven by an electric motor, but any drive means known in the art may be used, for example an hydraulic motor or by the operating force of a remote-control lever. Also, the throttle valve was opened $\frac{1}{3}$ of full opening in one mode of the arrangement described, but it could be opened to other degrees between fully closed and fully open. The degree of openness would be determined from the characteristics of the propulsion unit and the watercraft. In general, the invention is only intended to be limited by the scope of the following claims.

I claim:

1. A remote-control device for controlling a shifting unit and throttle valve of a marine propulsion unit with a least one remote control lever movable throughout both a central shifting range, wherein only shifting operations of the marine propulsion unit can occur, and at least one throttle range, wherein only throttle operations of the marine propulsion unit can occur, comprising:

a throttle drive means for opening and closing of the throttle valve in response to movement of said at least one remote control lever within the throttle range; and means for controlling the operation of said throttle drive means, said controlling means having a first operational mode wherein movement of said at least one remote control lever throughout the entire throttle range shifts the throttle valve from a fully closed position, corresponding to an idle condition of the marine propulsion unit, to a fully open position, a second operational mode wherein movement of said at least one remote control lever throughout the entire throttle range shifts the throttle valve from a fully closed position to a partially open position, and a third operational mode wherein the operating position of the throttle valve is maintained in an idle position regardless of the movement of said at least one remote control lever within the throttle range; and means for switching the operation of said controlling means between said first, second and third operational modes.

2. The remote-control device as claimed in claim 1, wherein said controlling means includes a control unit and a lever-position detector which senses the position of said at least one remote control lever, said control unit being adapted to supply an output signal to said throttle drive means in response to signals from said lever-position detector and said switching means.

3. The remote-control device as claimed in claim 2, wherein said throttle drive means includes a motor for positioning the throttle valve and means for controlling the operation of said motor in dependence upon said output signal.

4. The remote-control device as claimed in claim 1, further including a second remote control lever adapted to be interconnected with said throttle drive means and said controlling means through said switching means, said switching means including a manually engageable control element for altering which one of the remote-control levers is operational.

5. A remote-control device for controlling a shifting unit and a throttle valve of a marine propulsion unit with at least one remote control lever movable throughout both a central shifting range, wherein only shifting operations of the marine propulsion unit can occur, and at least one throttle range wherein only throttle operations of the marine propulsion unit can occur, comprising:

a throttle drive means for opening and closing of the throttle valve in response to movement of said at least one remote control lever within the throttle range; and means for controlling the operation of said throttle drive means, said controlling means having a first operational mode wherein movement of said at least one remote control lever in the throttle range shifts the throttle valve between fully closed and fully open positions with the relationship between displacement of said at least one remote control lever and opening the throttle valve being non-linear, a second operational mode wherein movement of said at least one remote control lever in the throttle range shifts the throttle valve between fully closed and fully open positions with the relationship between displacement of said at least one remote control lever and opening of the throttle valve being linear, and a third operational mode wherein the operating position of the throttle valve is maintained in an idle position regardless of the movement of said at least one remote control lever within the throttle range; and means for switching the operation of said controlling means between said first, second and third operational modes.

6. The remote-control device as claimed in claim 5, wherein said controlling means includes a control unit and a lever-position detector which senses the position of said at least one remote control lever, said control unit being adapted to supply an output signal to said throttle drive means in response to signals from said lever-position detector and said switching means.

7. The remote-control device as claimed in claim 6, wherein said throttle drive means includes a motor for positioning the throttle valve, the operation of said motor being controlled in dependence upon said output signal.

8. The remote-control device as claimed in claim 5, further including a second remote control lever adapted to be interconnected with said throttle drive means and said controlling means through said switching means, said switching means including a manually engageable control element for altering which one of the remote-control levers is operational.

9. A method of controlling the position of a shifting unit and throttle valve of a marine propulsion unit with at least one remote control lever movable throughout both a control shifting range, wherein only shifting operations of the marine propulsion unit can occur, and at least one throttle range, wherein only throttle operators of the marine propulsion unit can occur, through the use of a throttle drive means for opening and closing the throttle valve in response to movement of the at least one remote control lever within the throttle range; a means for controlling the operation of said throttle drive means having a first operational mode wherein movement of said at least one remote control lever throughout the entire throttle range shifts the throttle valve from a fully closed position, corresponding to an idle condition of the marine propulsion unit, to a fully open position, a second operational mode wherein movement of said at least one remote control lever throughout the entire throttle range shifts the throttle valve from a fully closed position to a partially open position throughout the entire throttle range, and a third operational mode wherein the operating position of the throttle valve is maintained in an idle position regardless of the movement of said at least one remote control lever within the throttle range; and a means for switching the operational mode of the controlling means, comprising:

sensing the position of the switching means;

switching the operation of the controlling means between the first, second and third operational modes in response to the position of the switching means;

sensing the position of the at least one remote control lever; and outputting a control signal from said controlling means to activate the throttle drive means so as to position the throttle valve in response to the sensed position of the at least one remote control lever.

* * * * *